US006971710B1

(12) United States Patent  (10) Patent No.: US 6,971,710 B1
Raasakka et al.  (45) Date of Patent: Dec. 6, 2005

(54) SIMPLIFIED WIND DEFLECTOR FOR VEHICLE SUNROOF APPLICATIONS

(75) Inventors: John Raasakka, Howell, MI (US); Michael Aneiros, Bingham Farms, MI (US); Daniel Cooney, Livonia, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/862,499

(22) Filed: Jun. 7, 2004

(51) Int. Cl.[7] ............................................. B60J 7/22
(52) U.S. Cl. ...................................................... 296/217
(58) Field of Search ........................................ 296/217

(56) References Cited

U.S. PATENT DOCUMENTS

| | | | |
|---|---|---|---|
| 3,711,150 A | | 1/1973 | Perks |
| 3,843,195 A | * | 10/1974 | Lidington ............... 296/217 |
| 3,904,239 A | * | 9/1975 | Jardin .................... 296/217 |
| 3,984,143 A | | 10/1976 | Vermeulen |
| 4,630,859 A | | 12/1986 | Bienert |
| 5,609,388 A | | 3/1997 | Hattass |
| 5,660,429 A | | 8/1997 | Wienchol |
| 6,523,889 B2 | | 2/2003 | Birndorfer |

FOREIGN PATENT DOCUMENTS

| | | | |
|---|---|---|---|
| DE | 3146908 | * | 6/1983 |
| DE | 3643738 C1 | | 3/1988 |
| DE | 3722361 A1 | | 1/1989 |
| DE | 3446916 C2 | | 12/1990 |
| DE | 3906685 C2 | | 5/1991 |
| DE | 4323694 C1 | | 8/1994 |
| DE | 4417049 C1 | | 6/1995 |
| DE | 4446016 C1 | | 1/1996 |
| DE | 4444630 C1 | | 2/1996 |
| DE | 19541848 | * | 5/1997 |
| DE | 19853358 A1 | | 5/2000 |
| DE | 19958748 A1 | | 6/2001 |
| EP | 0250925 | * | 6/1987 |
| EP | 0385222 | * | 2/1990 |
| JP | 7-28343 | * | 10/1995 |
| NL | 7510515 | | 3/1977 |

* cited by examiner

*Primary Examiner*—Dennis H. Pedder
(74) *Attorney, Agent, or Firm*—Carlson, Gaskey & Olds

(57) ABSTRACT

A wind deflector for use in a vehicle sunroof is formed of a resilient member that moves between a relaxed position and a compressed position. The resilient member is formed as one-piece of spring steel, and extends upwardly in front of an opening in a vehicle roof when in the relaxed position to deflect wind. As a vehicle sunroof panel moves to a closed position, the vehicle sunroof panel contacts and compresses the resilient member to a concealed position. The wind deflector thus provides a simplified construction when compared to the prior art.

20 Claims, 2 Drawing Sheets

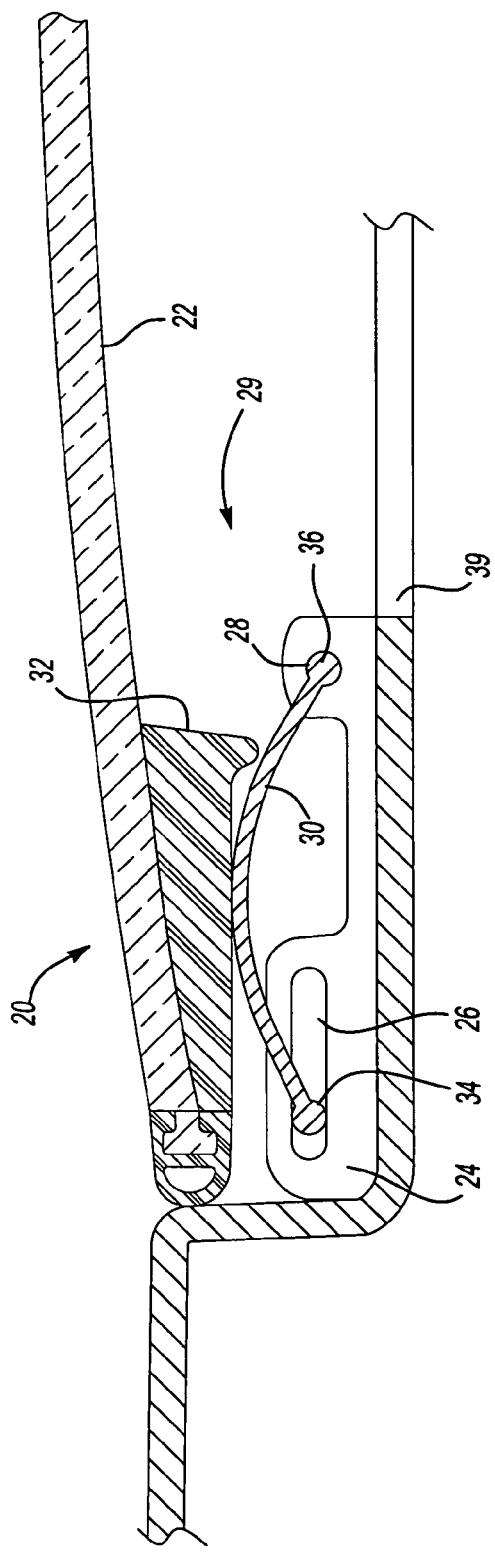
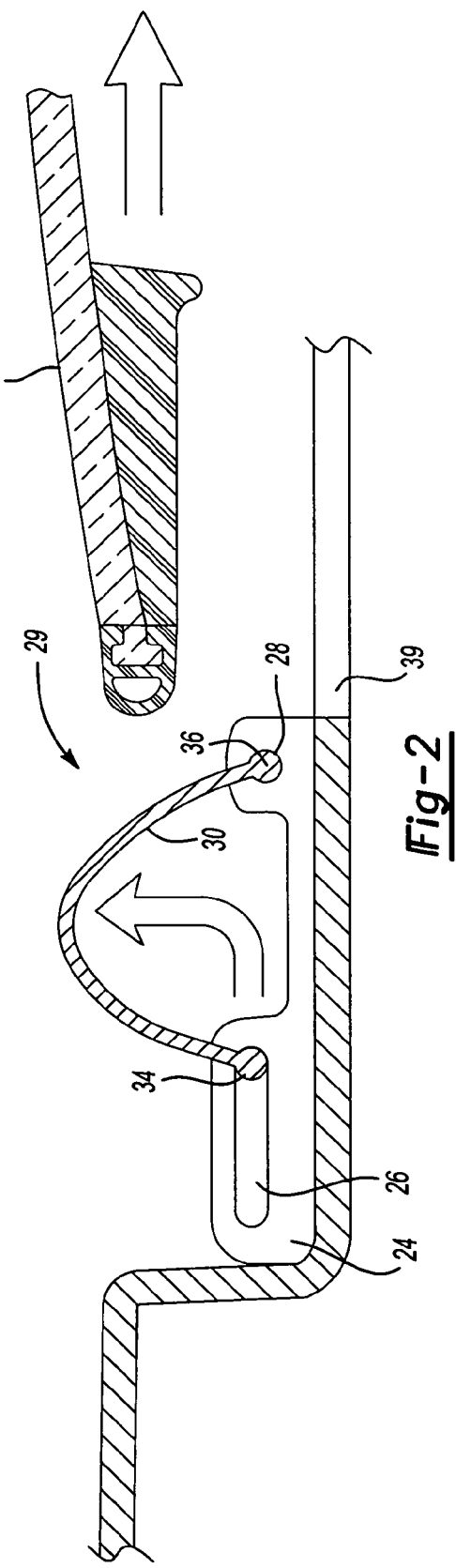

SIMPLIFIED WIND DEFLECTOR FOR VEHICLE SUNROOF APPLICATIONS

BACKGROUND OF THE INVENTION

This application relates to a wind deflector for use with a vehicle sunroof, wherein the wind deflector has a relaxed position and a compressed position. The wind deflector moves between these positions dependent on the position of the vehicle sunroof.

Vehicle sunroofs are widely utilized in modem vehicles. In a vehicle sunroof, a panel moves forwardly and rearwardly within an opening in a vehicle roof. The vehicle sunroof is moved to a rearward position to provide a vehicle occupant with the feeling of an open roof. When the vehicle sunroof is open, certain challenges are raised. Wind moves into the vehicle through a forward end of the opening, creating undesirable noise and airflow.

Wind deflectors have been positioned at the forward end of the opening to address these problems. Known wind deflectors have typically extended upwardly to deflect the wind away from the opening. Traditionally, these wind deflectors are spring biased to pivot between a concealed position, and an extended, wind deflecting position, when the panel has been moved rearwardly to an open position. In general, known wind deflectors have included multiple parts, and have been relatively expensive and complex.

It would be desirable to create a simplified wind deflector that reliably moves between the wind deflecting and concealed positions.

SUMMARY OF THE INVENTION

In the disclosed embodiment of this invention, a wind deflector includes a one piece resilient member that has a relaxed position and a concealed position. A sunroof panel opens or closes an opening formed in a vehicle roof. The sunroof panel controls movement of the resilient member between the relaxed position and the concealed position. The resilient member is in the relaxed position, extending upwardly, when the sunroof panel is in a rearward or open position. When the sunroof panel moves forwardly, the sunroof panel forces the resilient member away from the relaxed position to the concealed position. The wind deflector thus provides a wind deflecting function without the need for separate springs or connecting parts.

In one example, the wind deflector includes a pivot at one end. The pivot is pivotally mounted in a frame. An opposite end of the wind deflector is slidable relative to the frame. The pivot is positioned closer to the opening than the opposite end. In one example, the opposite end includes a pin that slides within a slot. In another example, the wind deflector has a curved surface adjacent the opposite end that is slidable within a track as the wind deflector moves between the relaxed position and concealed position.

The resilient member may be formed of a single sheet of stamped spring steel. The resilient member may be thinned out at an appropriate location to assist the movement of the wind deflector to the concealed position from the relaxed position.

These and other features of the present invention can be best understood from the following specification and drawings, the following of which is a brief description.

BRIEF DESCRIPTION OF THE DRAWINGS

FIG. 1 shows a vehicle sunroof in a forward closed position.

FIG. 2 shows the vehicle sunroof in a rearward open position.

DETAILED DESCRIPTION OF THE PREFERRED EMBODIMENT

Figure 3:
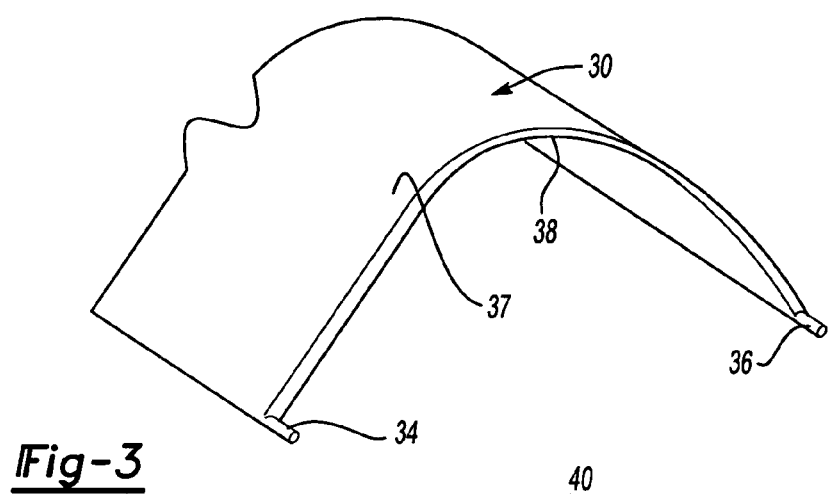
FIG. 3 is a view of a portion of a wind deflector according to this invention.

FIG. 1 shows a vehicle sunroof assembly 20 having a moving panel 22. As is known, the moving panel 22 moves between a forward and a rearward position in a vehicle to selectively close or open a vehicle roof opening 39. As shown in FIG. 1, the moving panel 22 is at its forward or closed position.

A wind deflector 29 has a frame 24 for a resilient member 30. Frame 24 includes a slot 26 at one end and a pivot mount 28 at an opposite end. The resilient member 30 has a moving pin 34, which moves within the slot 26, and a pivot pin 36 that is pivotally mounted within the pivot mount 28.

The moving panel 22 has a contact surface 32 that forces the resilient member 30 to a concealed position as shown in FIG. 1 from a relaxed position as shown in FIG. 2.

As shown in FIG. 2, the moving panel 22 is moved rearwardly to an open position. When the moving panel 22 is moved rearwardly, the resilient member 30 moves from the concealed position to its relaxed position. In the relaxed position, the resilient member 30 extends vertically upwardly from the concealed position, and deflects wind away from the vehicle roof opening 39. The inventive wind deflector 29 provides a very simplified arrangement having only one moving part. Thus, the present invention is simplified compared to the prior art.

Resilient member 30 is preferably made of a resilient material. In one embodiment, the resilient member 30 is formed as one piece from a spring steel.

FIG. 3 is a perspective view of the resilient member 30. As shown, the moving pin 34 and the pivot pin 36 are formed at opposed ends of a central u-shaped body portion 37. Preferably, the moving pin 34 and pivot pin 36 are stamped as one piece with the u-shaped body portion 37. Some machining is then done to cause the resilient member 30 to have its relaxed u-shape as shown in FIG. 3. A worker in the relevant art would recognize how to machine the resilient member 30 to have this relaxed shape. A thinned portion 38 is formed near an apex of the u-shaped body portion 37. The thinned portion 38 assists in decreasing the force required to collapse the resilient member 30 to the concealed position.

Figure 4:
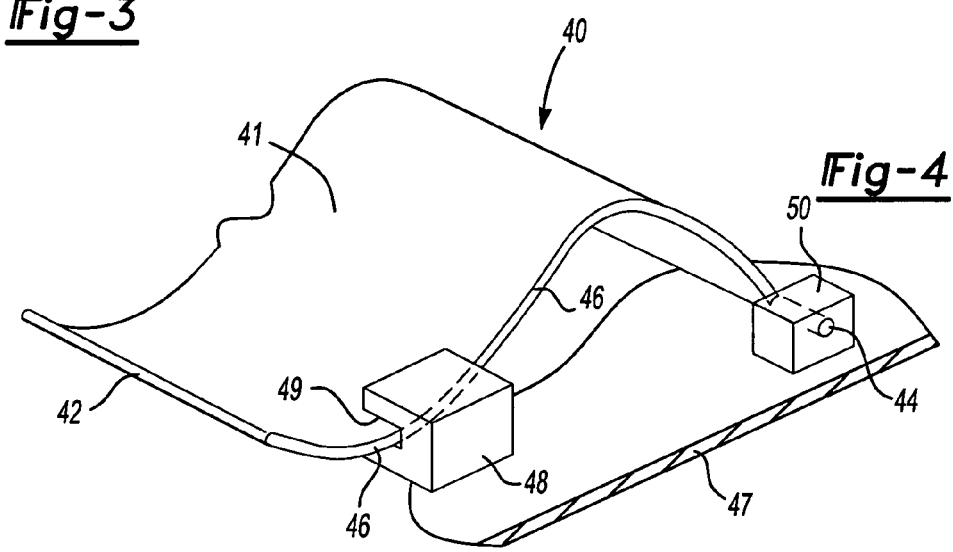
FIG. 4 shows a second embodiment of a wind deflector.

FIG. 4 shows another embodiment of a wind deflector 40 with a resilient member 41 having a pivot pin 44 and an end 42 opposite from the pivot pin 44. However, instead of a moving pin, the resilient member 41 includes a slide surface 46 adjacent end 42 that is formed along a curve.

Figure 5A:
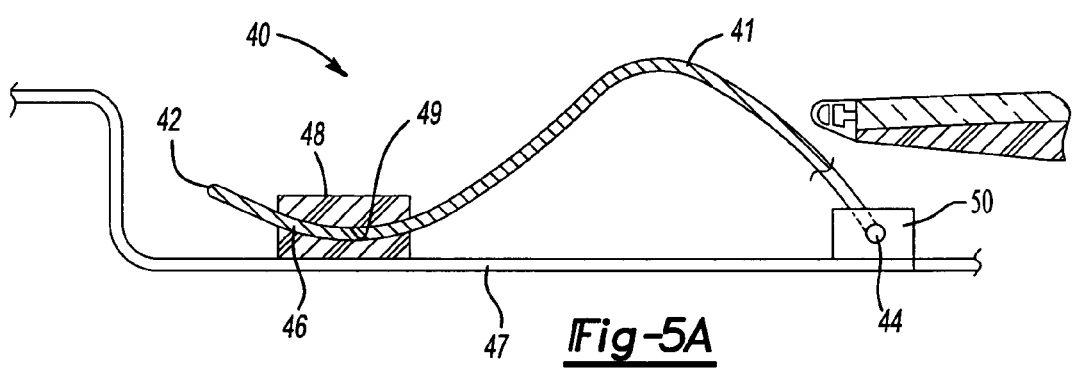
FIG. 5A shows the wind deflector of FIG. 4 in a relaxed, deflecting position.

As shown in FIG. 5A, a frame 47 for the wind deflector 40 includes a pivot mount 50 and a slide mount 48. The slide mount 48 includes a track 49 that receives the slide surface 46. As can be appreciated, the resilient member 41 in the relaxed position would extend upwardly as shown in FIG. 5A. This embodiment is formed in a fashion similar to the first embodiment.

Figure 5B:
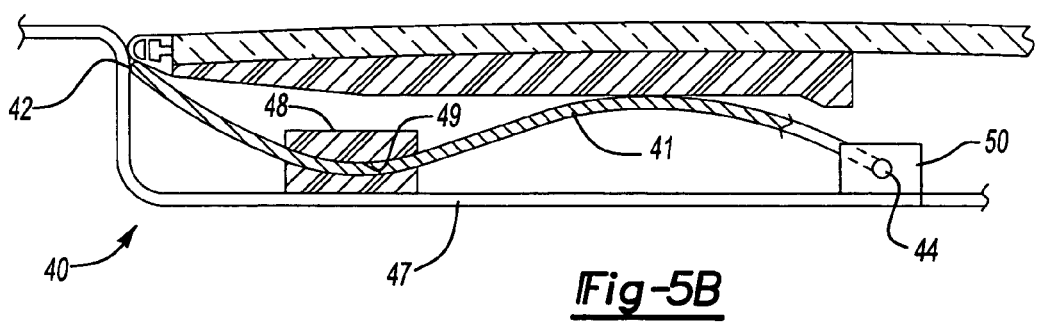
FIG. 5B shows the wind deflector of FIG. 4 in a concealed position.

As shown in FIG. 5B, when the moving panel 22 moves forwardly, the moving panel 22 compresses the resilient member 41 to the concealed position. During this movement, the resilient member 41 will pivot at pivot pin 44, and slide through track 49.

Although preferred embodiments of this invention have been disclosed, a worker of ordinary skill in this art would recognize that certain modifications would come within the scope of this invention. For that reason, the following claims should be studied to determine the true scope and content of this invention.

What is claimed is:

1. A wind deflector for use in a vehicle sunroof comprising:
   a resilient member having a relaxed position and a compressed position with one of said relaxed and said compressed positions having said resilient member extending vertically upwardly relative to the other of said positions, such that said resilient member deflects wind;
   a frame for mounting said resilient member adjacent an opening in a vehicle sunroof, wherein movement of a sunroof panel moves said resilient member between said relaxed and said compressed positions; and
   said resilient member having one end said pivot pivotally mounted in said frame, and said resilient member having a moving opposed end.

2. The wind deflector as set forth in claim 1, wherein said resilient member moves to said relaxed position when the sunroof panel is in an open position.

3. The wind deflector as set forth in claim 2, wherein said resilient member is formed of a single piece of material.

4. The wind deflector as set forth in claim 3, wherein said resilient member is formed of a spring steel.

5. The wind deflector as set forth in claim 2, wherein said resilient member is generally formed as a u-shape in cross-section.

6. A wind deflector for use in a vehicle sunroof comprising:
   a resilient member having a relaxed position and a compressed position with one of said relaxed and said compressed positions having said resilient member extending vertically upwardly relative to the other of said positions such that said resilient member deflects wind;
   a frame for mounting said resilient member adjacent an opening in a vehicle sunroof wherein movement of a sunroof panel moves said resilient member between said relaxed and said compressed positions;
   said resilient member moves to said relaxed position when the sunroof panel is in an open positions;
   said resilient member is generally formed as a u-shape in cross-section; and
   said resilient member has a generally uniform thickness along a significant portion of a length of said resilient member, and a thinned portion formed locally adjacent an apex of said u-shape to assist said resilient member in moving to said compressed position.

7. The wind deflector as set forth in claim 6, wherein said resilient member has a pivot at one end, said pivot pivotally mounted in said frame, and said resilient member having a moving opposed end.

8. The wind deflector as set forth in claim 1, wherein said frame includes a guide track for guiding a surface of said resilient member found adjacent said moving opposed end as said resilient member moves between said relaxed and said compressed positions.

9. The wind deflector as set forth in claim 1, wherein said frame includes a slot guiding a pin at said moving opposed end of said resilient member.

10. The wind deflector as set forth in claim 1, wherein said one end is spaced toward the opening relative to the moving opposed end.

11. A vehicle sunroof comprising:
    a panel movable between a closed position and an open position to close or open an opening in a vehicle roof;
    a wind deflector, including a resilient member, spaced apart from said panel when said panel is in said open position, and positioned for compression by said panel when said panel is in said closed position;
    said wind deflector including a frame, said resilient member having a relaxed position and a compressed position with one of said relaxed and said compressed positions having said resilient member extending vertically upwardly relative to the other of said positions, and said frame mounting said resilient member adjacent the opening wherein movement of said panel moves said resilient member between said relaxed and compressed positions; and
    said resilient member having a pivot at one end, said pivot pivotally mounted in said frame, and said resilient member having a moving opposed end.

12. The vehicle sunroof as recited in claim 11, wherein said resilient member is moved to said relaxed position when said panel is in said open position.

13. The vehicle sunroof as set forth in claim 12, wherein said resilient member is generally formed as a u-shape in cross-section.

14. A vehicle sunroof comprising:
    a panel movable between a closed position and an open position to close or open an opening in a vehicle roof;
    a wind deflector, including a resilient member spaced apart from said panel when said panel is in said open position and positioned for compression by said panel when said panel is in said closed position;
    said wind deflector including a frame, said resilient member having a relaxed position and a compressed position with one of said relaxed and said compressed positions having said resilient member extending vertically upwardly relative to the other of said positions, and said frame mounting said resilient member adjacent the opening wherein movement of said panel moves said resilient member between said relaxed and compressed positions;
    said resilient member is moved to said relaxed position when said panel is in said open position;
    said resilient member is generally formed as a u-shape in cross section; and
    said resilient member has a generally uniform thickness through the majority of a length of said resilient member, and a thinned portion formed locally adjacent an apex of said u-shape to assist said resilient member in moving to said compressed position.

15. The vehicle sunroof as set forth in claim 14, wherein said resilient member is formed of spring steel.

16. The vehicle sunroof as set forth in claim 11, wherein said resilient member is formed of a single piece of material.

17. The vehicle sunroof as set forth in claim 14, wherein said resilient member has a pivot at one end, said pivot pivotally mounted in said frame, and said resilient member having a moving opposed end.

18. The vehicle sunroof as set forth in claim 11, wherein said frame includes a guide track for guiding a surface of said resilient member found adjacent said moving opposed end as said resilient member moves between said relaxed and said compressed positions.

19. The vehicle sunroof as set forth in claim 11, wherein said frame includes a slot guiding a pin at said moving opposed end of said wind deflector.

20. The vehicle sunroof as set forth in claim 11, wherein said one end is spaced towards the opening relative to said moving opposed end.

* * * * *

UNITED STATES PATENT AND TRADEMARK OFFICE
CERTIFICATE OF CORRECTION

PATENT NO.    : 6,971,710 B1
DATED         : December 6, 2005
INVENTOR(S)   : Raasakka et al.

It is certified that error appears in the above-identified patent and that said Letters Patent is hereby corrected as shown below:

Column 3,
Line 24, insert -- a pivot at -- after "having" and before "one".
Line 24, insert -- , -- after "end" and before the second occurrence of "said".
Line 51, "positions" should read as -- position --.

Signed and Sealed this

Seventh Day of February, 2006

JON W. DUDAS
*Director of the United States Patent and Trademark Office*